UNITED STATES PATENT OFFICE.

MATTHEW EDWARDS, OF CAMBRIDGE, MASSACHUSETTS.

PROCESS FOR COLORING THE SURFACE OF METALS.

Specification forming part of Letters Patent No. 26,978, dated January 31, 1860.

*To all whom it may concern:*

Be it known that I, MATTHEW EDWARDS, of Cambridge, in the county of Middlesex and State of Massachusetts, have invented certain new and useful Improvements in Process of Coloring, Bronzing, or Darkening Metals; and I do hereby declare that the following description is a full and exact specification of the same, wherein I have set forth the nature and principles of my improvements, by which my invention may be distinguished from all others of a similar class, together with such parts as I claim and desire to have secured to me by Letters Patent.

The present invention consists in a new mode or process of coloring, bronzing, or darkening metals, which is particularly applicable, in connection with the well-known process of electroplating, to the production of a black, brown, or other colored groundwork to white lines or marks of silver or other white metal.

It has long been desired in thermometers, astronomical, surveying, and other instruments where the graduations are very close or finely marked to obtain white lines or marks upon a dark surface of metal, so that the readings thereon could be readily made; but no such graduations have heretofore been possible, the metal groundwork used for such purposes being, previous to my invention, invariably white and the lines black, the difficulties of which to the vision are manifest. By my new process I am enabled to color, bronze, or darken metals in a simple, cheap, and expeditious manner, and moreover, in the case of such metals as have had lines or marks of silver, platina, or other white metal previously deposited upon them, to produce this effect without coloring or defacing the said lines or marks, thereby affording a contrast between metallic groundwork and the marks, lines, or configurations thereon, the desirability of which has been hereinbefore briefly alluded to.

To produce the result of tinting or coloring metals the agents I employ are either chlorine, sulphur, or nitrogen, in connection with the action of a galvanic battery, and I will now proceed to describe the details of my new process, first enumerating some of the materials containing one or more of the above-named elements that may be used, as follows:

First, I can use diluted hydrochloric acid, chloride of sodium, chloride of potassium, chloride of ammonium, chlorate of potassium, and almost all salts and liquids containing chlorine; second, I can use diluted sulphuric acid and almost all salts and liquids containing sulphur; and third, I can use diluted nitric acid and almost all salts and liquids containing nitrogen.

To color metals I take, for instance, a solution of chloride of sodium, or common salt, and connect this solution, by means of a piece of copper or other metal, with the negative pole of a galvanic battery, whereby the electricity is conducted from that pole into the liquid in which the metal to be colored is immersed and connected with the positive pole of the battery. When the current of electricity is thus passed through the solution of chloride of sodium the salt held in solution is decomposed, and the chlorine, being the negative element, is set free at the positive pole, while the sodium, which is the positive element, is set free at the negative pole. The metal to be colored being connected with the positive pole of the battery, the chlorine there set free, having a strong affinity for metals, will unite with the metal to form a chloride. If the metal to be colored be copper or an alloy of copper—like brass—the chloride formed will be black, or nearly so.

The action of the battery on a solution containing sulphur or nitrogen is the same as on a solution containing chlorine, the sulphur or nitrogen, being set free at the positive pole, forming with the metal at that pole a sulphide or a nitrite, according to the element used.

The kind of salt used has a tendency to modify the result. For instance, the color produced on the same metal by different solutions is more or less adhesive and varies in tint. Thus, if brass be the metal to be colored and chloride of sodium be used in connection with the galvanic battery a black will be produced, whereas if chlorate of potassium be the solution the brass will be colored red.

To color or darken the surface or groundwork of a metal upon which silver, &c., has previously been deposited without injuring the incisions or deposits, it is only necessary to use a weak solution of any of those above enumerated in connection with the battery.

It will be observed that one great difference between the use of a battery for depositing one metal upon another, as in electroplating, and the application of the same agent for coloring metals is, that in the former case the metal to receive the deposit is connected with the negative pole of the battery. In the latter case the metal to be colored is connected with the positive pole.

Having thus described my improvements, I shall state my claim as follows: What I claim as my invention, and desire to have secured to me by Letters Patent, is—

The new process, substantially as hereinabove described, for coloring, darkening, or bronzing metals when the same is applied to metals that have had a previous deposit of white metal upon them.

MATTHEW EDWARDS.

Witnesses:
SAMUEL W. RICHARDS,
ALBERT W. BROWN.